Patented June 22, 1926.

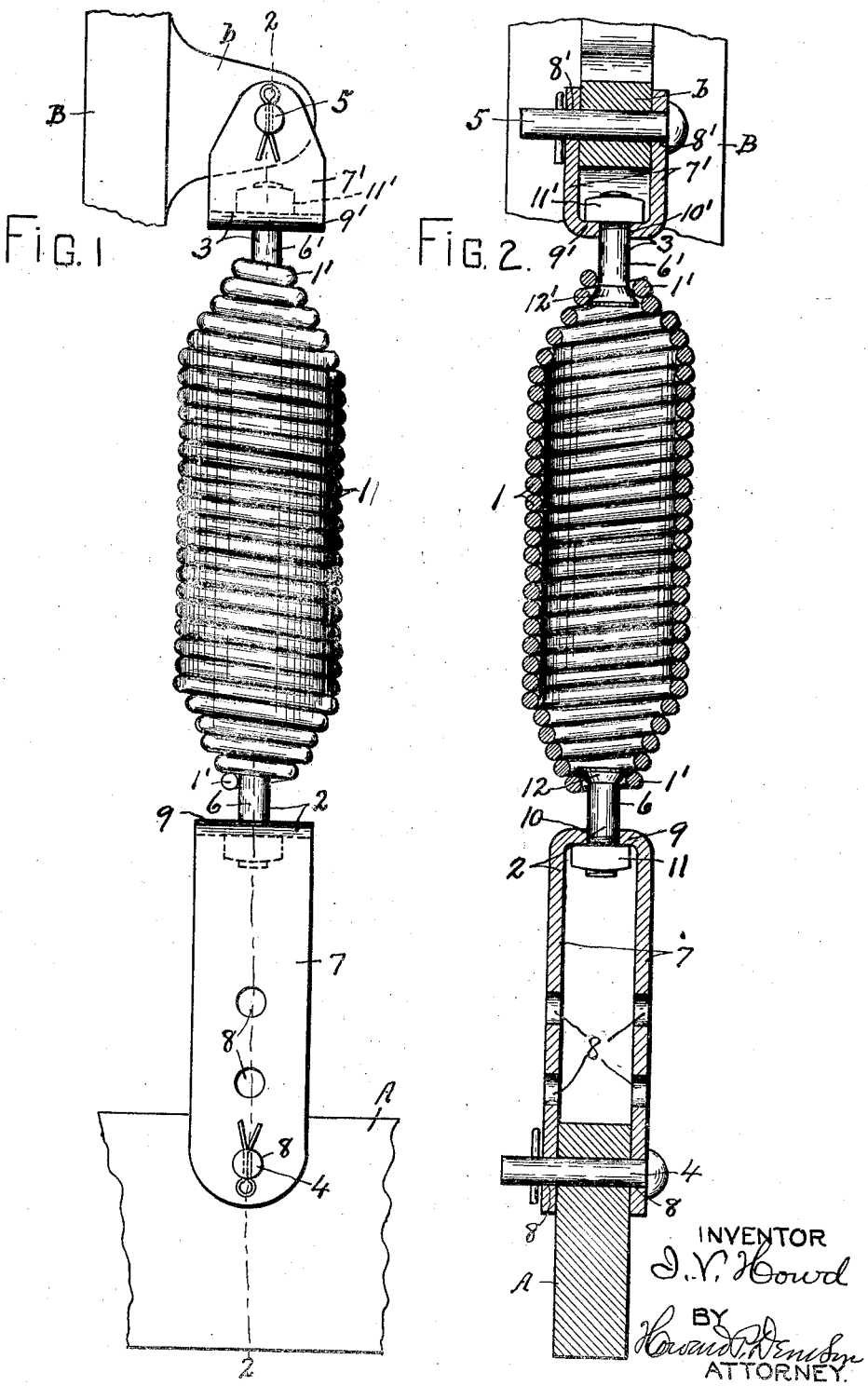

1,589,697

UNITED STATES PATENT OFFICE.

IRVING V. HOWD, OF SYRACUSE, NEW YORK.

RETRACTING DEVICE.

Application filed December 21, 1922. Serial No. 608,239.

This invention relates to a retracting device for pedal levers as used more particularly in connection with garment pressing machines and involves the use of a coil spring and suitable attaching members for connecting the ends of the spring to the pedal lever and to a superposed stationary part of the main supporting frame respectively whereby the pedal is automatically raised to its normal position and is adapted to be depressed by the operator against the action of the spring for forcing the pressing elements into pressing relation upon the garment.

Under these conditions, it is obvious that the position of the retracting device must vary to conform to the arc of movement of its connection with the pedal lever and that unless the attaching members are exactly coaxial with the axis of the coil, the various convolutions of the coil tend to unwind or twist circumferentially relatively to each other thereby transmitting angular strains upon the attaching members particularly if they are rigidly fastened to the ends of the spring resulting in frequent breakage of the attaching members.

The main object of my invention is to reduce this liability to a minimum by connecting the attaching members to the ends of the spring coaxial therewith and by providing each attaching member with a double swivel action whereby any tendency of the convolutions to rotate relatively to each other as the spring is extended and retracted will not be transmitted to the attaching members.

Another object is to provide at least one of the attaching members with a plurality of bolt openings whereby it may be adjusted to different positions relatively to the part to which it is attached by varying the normal position of the pedal lever or rather to enable the pedal to be adjusted to the most convenient position for operation.

Other objects and uses relating to specific parts of the device will be brought out in the following description.

In the drawings, Figure 1 is a side elevation of a retracting device and portions of a pedal and main supporting frame of a garment pressing machine with which the retracting device is used.

Figure 2 is a longitudinal vertical sectional view taken on line 2—2, Figure 1.

In order that this invention may be clearly understood, I have shown portions of a pedal lever —A— and main supporting frame —B— of a garment pressing machine in which the frame is provided with a rearwardly projecting lug —b—.

The retracting device comprises a coil spring —1— and lower and upper attaching members —2— and —3—, the member —2— being connected to the pedal lever by means of a pivotal bolt —4— while the upper attaching member is connected to the lug —b— by a similar pivotal bolt —5—.

The lug —b— extends in the direction of the length of the lever —A— some distance above and in substantially the same vertical plane of said lever so that the entire retracting device normally assumes a substantially vertical position mainly between the lug —b— and lever —A— when adjusted for use.

The main body of the coil spring —1— is substantially cylindrical, but its lower and upper ends are tapered so that the end convolutions as —1'— are of relatively smaller diameter than the main body, but are coaxial therewith and constitute end bearings for the attaching members —2— and —3—.

The lower attaching member —2— comprises a bolt —6— and an inverted U-shaped clevis having its opposite arms extended downwardly at opposite sides of the pedal lever —A— and provided with a series of bolt openings —8— in spaced relation one above the other for receiving the bolt —4— and permitting relative vertical adjustment of the clevis and lever as may be desired to normally support the lever at different elevations to suit the convenience of the operator or to obtain the required movement of the parts which are actuated by said lever.

The upper cross bar as —9— of the clevis —7— is provided with a central aperture —10— for receiving the lower end of the cylindrical bolt —6— which is threaded and provided with a nut —11— for engaging the underside of the cross bar —9— and thereby holding the bolt against upward displacement and the clevis against downward displacement, said nut being preferably square and of sufficient width to lie in close proximity to the adjacent arms of the clevis to hold it against turning movement on the bolt relatively to said clevis.

The upper end of the bolt extends through and beyond the lower convolution of the spring and is provided with a head —12— of greater diameter than the interior diameter of said lower convolution for holding the spring and bolt against relative endwise displacement while permitting their relative rotation one upon the other, said bolt being of sufficient length to leave ample clearance between the upper end of the clevis and lower end of the spring to allow their free relative rotation without friction one with the other.

The lower end of the bolt —6— extends loosely through the opening —10— to permit free relative axial movement of the bolt and clevis one upon the other.

The upper attaching member —3— comprises a bolt —6'— and a U-shaped clevis —7'— which is similar to the clevis —7— except that it is somewhat shorter but has its opposite arms extended upwardly at opposite sides of the lug —b— and provided with apertures —8'— for receiving the adjacent pivotal bolt —5—, the latter being passed through a registering opening —13'— in the lug —b—.

The lower cross bar as —9'— of the clevis —7— is provided with a central bolt opening —10'— for receiving the upper end of the bolt —6'— which is threaded and engaged by a nut —11'—. This nut rests upon the upper face of the cross bar —9'— and is preferably square and of sufficient size to lie in close proximity to the opposite arms of the clevis to prevent relative rotation of those parts, the upper threaded end of the bolt being preferably offset to avoid accidental displacement of the nut therefrom.

The lower end of the bolt —6'— extends through the upper convolutions of the spring —1— and is provided with a head —12'— of greater diameter than the interior diameter of said convolution to prevent relative endwise displacement of those parts while permitting them to turn freely one upon the other.

The bolt —6'— extends loosely through the opening —10'— to permit relative axial movement of the clevis and bolt one upon the other.

It will be observed that both of the bolts —6— and —6'— are coaxial with each other and with the axis of the spring —1— and that the clevis —7— and —7'— are disposed symmetrically about the same axis while the pivotal bolts —4— and —5— pass through said axis at right angles thereto, the effect of which is to keep all parts of the retracting device in a straight line in all positions of adjustment of the lever.

This straight line action and freedom from angular strains is further assured by the reduced or conical ends of the spring and the seating of the heads —12— and —12'— of the bolts —6— and —6'— within and upon the smaller convolutions thereby establishing not only swivel connections but also practically universal joints between the bolts and ends of the spring all of which contributes materially to the permanency, durability and ease of action of the retracting device as a whole.

I claim:

In combination with a main supporting frame and pedal lever of a garment pressing machine, retracting means for the pedal lever comprising a coil spring supported entirely by and between said frame and pedal lever and having its opposite end convolutions reduced in diameter and coaxial with the axis of the spring, opposite end bolts extending through said end convolutions and provided with heads engaging the inner faces thereof, said bolts being coaxial with the axis of the spring and rotatable relatively thereto and clevises swiveled upon the outer ends of the bolts and provided with means for connection with the frame and pedal lever respectively, one of the clevises being provided with a plurality of apertures for receiving the connecting means and permitting it to be adjusted to different positions relatively to the part to which it is connected.

In witness whereof I have hereunto set my hand this 15th day of December 1922.

IRVING V. HOWD.